US007668611B2

(12) United States Patent
Reichelt et al.

(10) Patent No.: US 7,668,611 B2

(45) Date of Patent: Feb. 23, 2010

(54) APPARATUS AND METHOD FOR CONTROLLING A WAVE FIELD SYNTHESIS RENDERING MEANS

(75) Inventors: Katrin Reichelt, Ilmenau (DE); Gabriel Gatzsche, Martinroeda (DE); Thomas Heimrich, Keuhndorf (DE); Kai-Uwe Sattler, Ilmenau (DE); Sandra Brix, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 404 days.

(21) Appl. No.: 11/840,327

(22) Filed: Aug. 17, 2007

(65) Prior Publication Data

US 2008/0008326 A1 Jan. 10, 2008

Related U.S. Application Data

(63) Continuation of application No. PCT/EP2006/001360, filed on Feb. 15, 2006.

(30) Foreign Application Priority Data

Feb. 23, 2005 (DE) ...................... 10 2005 008 333

(51) Int. Cl.
*G06F 17/00* (2006.01)
*H04R 5/00* (2006.01)
*G06F 3/00* (2006.01)
*G06F 5/00* (2006.01)

(52) U.S. Cl. ............................ 700/94; 381/18; 710/18; 710/40

(58) Field of Classification Search ............. 700/11–14, 700/21, 28, 31–33, 94; 710/29, 40, 15, 17, 710/18, 43, 45, 58–60; 381/17, 18
See application file for complete search history.

(56) References Cited

U.S. PATENT DOCUMENTS 5,142,586 A * 8/1992 Berkhout ..................... 381/63

(Continued)

FOREIGN PATENT DOCUMENTS

EP 0700180 A1 3/1996

(Continued)

OTHER PUBLICATIONS

Scheirer, et al. "AudioBIFS: Describing Audio Scenes with the MPEG-4 Multimedia Standard", Sep. 1999, IEEE, IEEE Transactions on Multimedia vol. 1, No. 3, all pages (237-250).*

(Continued)

*Primary Examiner*—Quoc D Tran
*Assistant Examiner*—Jesse A Elbin
(74) *Attorney, Agent, or Firm*—Keating & Bennett, LLP

(57) ABSTRACT

For controlling a wave field synthesis renderer arranged in a wave field synthesis system, a scene description, in which not an absolute position or an absolute time instant, but a time span or location span within which the audio object may vary is indicated for a source, is used. Furthermore, there is provided a monitor, which monitors a utilization situation of the wave field synthesis system. An audio object manipulator finally varies the starting point of the audio object to be considered by the wave field synthesis renderer or the actual position of the audio object within the time span and/or location span, in order to avoid capacity bottlenecks on the transmission lines or in the renderer.

14 Claims, 6 Drawing Sheets

U.S. PATENT DOCUMENTS 5,715,318 A * 2/1998 Hill et al. ...................... 381/17
2005/0105442 A1 5/2005 Melchior et al.
2005/0175197 A1 8/2005 Melchior et al.

FOREIGN PATENT DOCUMENTS

WO 2004/036955 A1 4/2004
WO 2004/047485 A1 6/2004

OTHER PUBLICATIONS

English translation of the official communication issued in counterpart German Application No. 10 2005 008 333.1, mailed on Feb. 16, 2006.

Official communication issued in the counterpart International Application No. PCT/EP2006/001360, mailed on May 12, 2006.

Berkhout, A.J. et al.: "Acoustic Control by Wave Field Synthesis," Journal of the Acoustical Society of America, AIP/Acoustical Society of America, No. 5, pp. 2764-2778, NY, US, May 1993.

Heimrich, T.: "Modeling of Output Contraints in Multimedia Database Systems," First International Multimedia Modelling Conference, IEEE, Jan. 2, 2005-Jan. 14, 2005.

Melchior, F. et al.: "Authoring System for Wave Field Synthesis," AES Convention Paper, 115th Convention, AES Meeting, Oct. 10, 2003, pp. 1-10.

Katrin Reichelt et al., "Apparatus and Method for Controlling a Wave Field Synthesis Renderer Means With Audio Objects," U.S. Appl. No. 11/837,099, filed Aug. 10, 2007.

Katrin Reichelt et al., "Apparatus and Method for Simulating a Wave Field Synthesis System," U.S. Appl. No. 11/837,105, filed Aug. 10, 2007.

Katrin Reichelt et al., "Apparatus and Method for Storing Audio Files," U.S. Appl. No. 11/837,109, filed Aug. 10, 2007.

Katrin Reichelt et al., "Apparatus and Method for Providing Data in a Multi-Renderer System," U.S. Appl. No. 11/840,333, filed Aug. 17, 2007.

Office Action issued in U.S. Appl. No. 11/837,099, mailed on Oct. 22, 2009.

Seo et al., "Implementation of Interactive 3D Audio Using MPEG-4 Multimedia Standards," Oct. 2003, Audio Engineering Society, Convention Paper 5980, pp. 1-6.

* cited by examiner

AUDIO OBJECT:
- AUDIO FILE
- IDENTIFICATION OF THE VIRTUAL SOURCE
- TIME SPAN FOR BEGINNING/END
- LOCATION SPAN FOR POSITION
- ...

APPARATUS AND METHOD FOR CONTROLLING A WAVE FIELD SYNTHESIS RENDERING MEANS

CROSS-REFERENCE TO RELATED APPLICATIONS

This application is a continuation of copending International Application No. PCT/EP2006/001360, filed Feb. 15, 2006, which designated the United States and was not published in English.

BACKGROUND OF THE INVENTION

1. Field of the Invention

The present invention relates to the field of wave field synthesis, and particularly to the control of a wave field synthesis rendering means with data to be processed.

The present invention relates to wave field synthesis concepts, and particularly to an efficient wave field synthesis concept in connection with a multi-renderer system.

2. Description of the Related Art

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel loudspeaker reproduction of audio signals have been known and standardized for many years. All usual techniques have the disadvantage that both the site of the loudspeakers and the position of the listener are already impressed on the transmission format. With wrong arrangement of the loudspeakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave field synthesis (WFS), have been studied at the TU Delft and first presented in the late 80s (Berkout, A. J.; de Vries, D.; Vogel, P.: Acoustic control by Wave field Synthesis. JASA 93, 1993).

Due to this method's enormous demands on computer power and transfer rates, the wave field synthesis has up to now only rarely been employed in practice. Only the progress in the area of the microprocessor technology and the audio encoding do permit the employment of this technology in concrete applications today. First products in the professional area are expected next year. In a few years, first wave field synthesis applications for the consumer area are also supposed to come on the market.

The basic idea of WFS is based on the application of Huygens' principle of the wave theory:

Each point caught by a wave is starting point of an elementary wave propagating in spherical or circular manner.

Applied on acoustics, every arbitrary shape of an incoming wave front may be replicated by a large amount of loudspeakers arranged next to each other (a so-called loudspeaker array). In the simplest case, a single point source to be reproduced and a linear arrangement of the loudspeakers, the audio signals of each loudspeaker have to be fed with a time delay and amplitude scaling so that the radiating sound fields of the individual loudspeakers overlay correctly. With several sound sources, for each source the contribution to each loudspeaker is calculated separately and the resulting signals are added. If the sources to be reproduced are in a room with reflecting walls, reflections also have to be reproduced via the loudspeaker array as additional sources. Thus, the expenditure in the calculation strongly depends on the number of sound sources, the reflection properties of the recording room, and the number of loudspeakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real loudspeaker array and the listener.

Although the wave field synthesis functions well for environments the properties of which are known, irregularities occur if the property changes or the wave field synthesis is executed on the basis of an environment property not matching the actual property of the environment.

A property of the surrounding may also be described by the impulse response of the surrounding.

This will be set forth in greater detail on the basis of the subsequent example. It is assumed that a loudspeaker sends out a sound signal against a wall, the reflection of which is undesired. For this simple example, the space compensation using the wave field synthesis would consist in the fact that at first the reflection of this wall is determined in order to ascertain when a sound signal having been reflected from the wall again arrives the loudspeaker, and which amplitude this reflected sound signal has. If the reflection from this wall is undesirable, there is the possibility, with the wave field synthesis, to eliminate the reflection from this wall by impressing a signal with corresponding amplitude and of opposite phase to the reflection signal on the loudspeaker, so that the propagating compensation wave cancels out the reflection wave, such that the reflection from this wall is eliminated in the surrounding considered. This may be done by at first calculating the impulse response of the surrounding and then determining the property and position of the wall on the basis of the impulse response of this surrounding, wherein the wall is interpreted as a mirror source, i.e. as a sound source reflecting incident sound.

If at first the impulse response of this surrounding is measured and then the compensation signal, which has to be impressed on the loudspeaker in a manner superimposed on the audio signal, is calculated, cancellation of the reflection from this wall will take place, such that a listener in this surrounding has the sound impression that this wall does not exist at all.

However, it is crucial for optimum compensation of the reflected wave that the impulse response of the room is determined accurately so that no over- or undercompensation occurs.

Thus, the wave field synthesis allows for correct mapping of virtual sound sources across a large reproduction area. At the same time it offers, to the sound master and sound engineer, new technical and creative potential in the creation of even complex sound landscapes. The wave field synthesis (WFS, or also sound field synthesis), as developed at the TU Delft at the end of the 80s, represents a holographic approach of the sound reproduction. The Kirchhoff-Helmholtz integral serves as a basis for this. It states that arbitrary sound fields within a closed volume can be generated by means of a distribution of monopole and dipole sound sources (loudspeaker arrays) on the surface of this volume.

In the wave field synthesis, a synthesis signal for each loudspeaker of the loudspeaker array is calculated from an audio signal sending out a virtual source at a virtual position, wherein the synthesis signals are formed with respect to amplitude and phase such that a wave resulting from the superposition of the individual sound wave output by the loudspeakers present in the loudspeaker array corresponds to the wave that would be due to the virtual source at the virtual position if this virtual source at the virtual position were a real source with a real position.

Typically, several virtual sources are present at various virtual positions. The calculation of the synthesis signals is performed for each virtual source at each virtual position, so that typically one virtual source results in synthesis signals for several loudspeakers. As viewed from a loudspeaker, this loudspeaker thus receives several synthesis signals, which go back to various virtual sources. A superposition of these sources, which is possible due to the linear superposition principle, then results in the reproduction signal actually sent out from the loudspeaker.

The possibilities of the wave field synthesis can be utilized the better, the larger the loudspeaker arrays are, i.e. the more individual loudspeakers are provided. With this, however, the computation power the wave field synthesis unit must summon also increases, since channel information typically also has to be taken into account. In detail, this means that, in principle, a transmission channel of its own is present from each virtual source to each loudspeaker, and that, in principle, it may be the case that each virtual source leads to a synthesis signal for each loudspeaker, and/or that each loudspeaker obtains a number of synthesis signals equal to the number of virtual sources.

If the possibilities of the wave field synthesis particularly in movie theatre applications are to be utilized in that the virtual sources can also be movable, it can be seen that rather significant computation powers are to be handled due to the calculation of the synthesis signals, the calculation of the channel information and the generation of the reproduction signals through combination of the channel information and the synthesis signals.

Furthermore, it is to be noted at this point that the quality of the audio reproduction increases with the number of loudspeakers made available. This means that the audio reproduction quality becomes the better and more realistic, the more loudspeakers are present in the loudspeaker array(s).

In the above scenario, the completely rendered and analog-digital-converted reproduction signal for the individual loudspeakers could, for example, be transmitted from the wave field synthesis central unit to the individual loudspeakers via two-wire lines. This would indeed have the advantage that it is almost ensured that all loudspeakers work synchronously, so that no further measures would be needed for synchronization purposes here. On the other hand, the wave field synthesis central unit could be produced only for a particular reproduction room or for reproduction with a fixed number of loudspeakers. This means that, for each reproduction room, a wave field synthesis central unit of its own would have to be fabricated, which has to perform a significant measure of computation power, since the computation of the audio reproduction signals must take place at least partially in parallel and in real time, particularly with respect to many loudspeakers and/or many virtual sources.

German patent DE 10254404 B4 discloses a system as illustrated in FIG. 7. One part is the central wave field synthesis module 10. The other part consists of individual loudspeaker modules 12*a*, 12*b*, 12*c*, 12*d*, 12*e*, which are connected to actual physical loudspeakers 14*a*, 14*b*, 14*c*, 14*d*, 14*e*, such as it is shown in FIG. 1. It is to be noted that the number of the loudspeakers 14*a*-14*e* lies in the range above 50 and typically even significantly above 100 in typical applications. If a loudspeaker of its own is associated with each loudspeaker, the corresponding number of loudspeaker modules also is needed. Depending on the application, however, it is advantageous to address a small group of adjoining loudspeakers from a loudspeaker module. In this connection, it is arbitrary whether a loudspeaker module connected to four loudspeakers, for example, feeds the four loudspeakers with the same reproduction signal, or corresponding different synthesis signals are calculated for the four loudspeakers, so that such a loudspeaker module actually consists of several individual loudspeaker modules, which are, however, summarized physically in one unit.

Between the wave field synthesis module 10 and every individual loudspeaker 12*a*-12*e*, there is a transmission path 16*a*-16*e* of its own, with each transmission path being coupled to the central wave field synthesis module and a loudspeaker module of its own.

A serial transmission format providing a high data rate, such as a so-called Firewire transmission format or a USB data format, is advantageous as data transmission mode for transmitting data from the wave field synthesis module to a loudspeaker module. Data transfer rates of more than 100 megabits per second are advantageous.

The data stream transmitted from the wave field synthesis module 10 to a loudspeaker module thus is formatted correspondingly according to the data format chosen in the wave field synthesis module and provided with synchronization information provided in usual serial data formats. This synchronization information is extracted from the data stream by the individual loudspeaker modules and used to synchronize the individual loudspeaker modules with respect to their reproduction, i.e. ultimately to the analog-digital conversion for obtaining the analog loudspeaker signal and the sampling (re-sampling) provided for this purpose. The central wave field synthesis module works as a master, and all loudspeaker modules work as clients, wherein the individual data streams all obtain the same synchronization information from the central module 10 via the various transmission paths 16*a*-16*e*. This ensures that all loudspeaker modules work synchronously, namely synchronized with the master 10, which is important for the audio reproduction system so as not to suffer loss of audio quality, so that the synthesis signals calculated by the wave field synthesis module are not irradiated in temporally offset manner from the individual loudspeakers after corresponding audio rendering.

The concept described indeed provides significant flexibility with respect to a wave field synthesis system, which is scalable for various ways of application. But it still suffers from the problem that the central wave field synthesis module, which performs the actual main rendering, i.e. which calculates the individual synthesis signals for the loudspeakers depending on the positions of the virtual sources and depending on the loudspeaker positions, represents a "bottleneck" for the entire system. Although, in this system, the "post-rendering", i.e. the imposition of the synthesis signals with channel transmission functions, etc., is already performed in decentralized manner, and hence the necessary data transmission capacity between the central renderer module and the individual loudspeaker modules has already been reduced by selection of synthesis signals with less energy than a determined threshold energy, all virtual sources, however, still have to be rendered for all loudspeaker modules in a way, i.e. converted into synthesis signals, wherein the selection takes place only after rendering.

This means that the rendering still determines the overall capacity of the system. If the central rendering unit thus is capable of rendering 32 virtual sources at the same time, for example, i.e. to calculate the synthesis signals for these 32 virtual sources at the same time, serious capacity bottlenecks occur, if more than 32 sources are active at one time in one audio scene. For simple scenes this is sufficient. For more complex scenes, particularly with immersive sound impressions, i.e. for example when it is raining and many rain drops represent individual sources, it is immediately apparent that the capacity with a maximum of 32 sources will no longer suffice. A corresponding situation also exists if there is a large orchestra and it is desired to actually process every orchestral player or at least each instrument group as a source of its own at its own position. Here, 32 virtual sources may very quickly become too less.

Typically, in a known wave field synthesis concept, one uses a scene description in which the individual audio objects are defined together such that, using the data in the scene description and the audio data for the individual virtual sources, the complete scene can be rendered by a renderer or a multi-rendering arrangement. Here, it is exactly defined for each audio object, where the audio object has to begin and where the audio object has to end. Furthermore, for each audio object, the position of the virtual source at which that virtual source is to be, i.e. which is to entered into the wave field synthesis rendering means, is indicated exactly, so that the corresponding synthesis signals are generated for each loudspeaker. This results in the fact that, by superposition of the sound waves output from the individual loudspeakers as a reaction to the synthesis signals, an impression develops for a listener as if a sound source were positioned at a position in the reproduction room or outside the reproduction room, which is defined by the source position of the virtual source.

Typically, the capacities of the wave field synthesis system are limited. This leads to each renderer having limited computation capacity. Typically, a renderer is capable of processing 32 audio sources at the same time. Furthermore, a transmission path from the audio server to the renderer has limited transmission bandwidth, i.e. provides a maximum transfer rate in bits per second.

For simple scenes, in which e.g. only two virtual sources exist, if it is thought of a dialog, wherein a further virtual source is present in addition for a background noise, the processing capacity of the renderer, which can in fact process e.g. 32 sources at the same time, is not problematic. Furthermore, in this case, the transmission volume to a renderer is so small that the capacity of the transmission path is sufficient.

However, problems will occur when more complex scenes are to be reproduced, i.e. scenes having more than 32 virtual sources. In such a case, which for example occurs when to correctly reproduce a scene in the rain, or to naturally reproduce an applause scene, the maximum computation capacity of a renderer limited to 32 virtual sources quickly will no longer be sufficient. This is due to the fact that very many individual virtual sources exist, since, e.g. in an audience, every listener who is applauding may in principle be understood as a virtual source of its own at a virtual position of its own. In order to deal with this limitation, several possibilities exist. Thus, one possibility is to take care, already when creating the scene description, that a renderer never has to process 32 audio objects at the same time.

Another possibility is to make no allowances for actual wave field synthesis conditions when creating the scene description, but simply to create the scene description in the way the scene author desires it.

This possibility is of advantage with respect to higher flexibility and portability of scene descriptions among different wave field synthesis systems, because therewith arise scene descriptions, which are not designed for a specific system, but are more general. In other words, this leads to the fact that the same scene description, when running on a wave field synthesis system having renderers with high capacity, leads to a better listener impression than in a system having renderers with low computation capacity. In other words, the second possibility is advantageous in that a scene description also does not lead to better listening impression in a wave field synthesis system with better capacity due to the fact that it has been created with a wave field synthesis system with strongly limited capacity.

However, it is disadvantageous in the second possibility that, when the wave field synthesis system is brought past its maximum capacity, performance losses or other problems connected thereto will occur, because the renderer may simply reject processing of excess sources due to its maximum capacity, when it is to process more sources.

SUMMARY OF THE INVENTION

According to an embodiment, an apparatus for controlling a wave field synthesis renderer arranged in a wave field synthesis system, wherein the wave field synthesis renderer is formed to generate, from audio objects, wherein an audio file for a virtual source arranged at a source position is associated with an audio object, synthesis signals for a plurality of loudspeakers coupled to the wave field synthesis renderer, may have: a provider for providing a scene description, wherein the scene description sets a temporal sequence of audio objects, wherein an audio object defines a temporal start or a temporal end for a virtual source associated with the audio object, wherein the audio object for the virtual source has a time span in which the start or the end of the audio object must be, or wherein the audio object has a location span in which a position of the virtual source must be; a monitor for monitoring a utilization situation of the wave field synthesis system; and an audio object manipulator for varying an actual starting point or end point of the audio object to be considered by the wave field synthesis renderer within the time span or an actual position of the virtual source within the location span, depending on a utilization situation of the wave field synthesis system.

According to another embodiment, a method for controlling a wave field synthesis renderer arranged in a wave field synthesis system, wherein the wave field synthesis renderer is formed to generate, from audio objects, wherein an audio file for a virtual source arranged at a source position is associated with an audio object, synthesis signals for a plurality of loudspeakers coupled to the wave field synthesis renderer, may have the steps of: providing a scene description, wherein the scene description sets a temporal sequence of audio objects, wherein an audio object defines a temporal start or a temporal end for a virtual source associated with the audio object, wherein the audio object for the virtual source has a time span in which the start or the end of the audio object must be, or wherein the audio object has a location span in which a position of the virtual source must be; monitoring a utilization situation of the wave field synthesis system; and varying an actual starting point or end point of the audio object to be considered by the wave field synthesis renderer within the time span or an actual position of the virtual source within the location span, depending on a utilization situation of the wave field synthesis system.

According to another embodiment, a computer program may have program code for performing, when the program is executed on a computer, a method for controlling a wave field synthesis renderer arranged in a wave field synthesis system, wherein the wave field synthesis renderer is formed to generate, from audio objects, wherein an audio file for a virtual source arranged at a source position is associated with an audio object, synthesis signals for a plurality of loudspeakers coupled to the wave field synthesis renderer, wherein the method may have the steps of: providing a scene description, wherein the scene description sets a temporal sequence of audio objects, wherein an audio object defines a temporal start or a temporal end for a virtual source associated with the audio object, wherein the audio object for the virtual source has a time span in which the start or the end of the audio object must be, or wherein the audio object has a location span in which a position of the virtual source must be; monitoring a utilization situation of the wave field synthesis system; and varying an actual starting point or end point of the audio object to be considered by the wave field synthesis renderer within the time span or an actual position of the virtual source within the location span, depending on a utilization situation of the wave field synthesis system.

The present invention is based on the finding that factual capacity limits can be expanded by intercepting processing load peaks occurring in the wave field synthesis by varying start and/or end of an audio object or the position of an audio object within a time span or location span, in order to intercept an overload peak, which maybe only exists for a short time. This is achieved by indicating, for certain sources in which the start and/or the end or even the position may be variable within a certain span, corresponding spans in the scene descriptions instead of fixed time instants, and by then varying the actual beginning and the actual virtual position of an audio object within this time span and/or location span depending on a utilization (work-load) situation in the wave field synthesis system.

Thus, it has been found out that, due to the high dynamics of scenes typically to be processed, the actual number of audio sources at a time instant may vary strongly, but that overload situations, i.e. a very large number of virtual sources to be active at the same time, occur for a relatively short time only.

According to the invention, such overload situations are reduced or even completely eliminated by shifting audio objects forward and/or backward within their time span or shifting same with respect to their positions in multi-renderer systems, so that one of the renderers no longer has to generate synthesis signals for this virtual source due to the changed position.

Audio objects particularly well suited for such a time span/location span definition, are sources having noises as content, i.e. e.g. clapping noises, drop noises or any other background noises, such as a wind noise or e.g. also a driving noise of a train approaching from far away. Here, it will not play any role for the audio impression or the listening experience of the listener whether a wind noise starts a few seconds earlier or later, or whether the train enters the audio scene at a changed virtual position than it was actually demanded by the original author of the scene description.

The effects on the very dynamically occurring overload situation described may, however, be eminent. Thus, the planning or scheduling for audio sources within the scope of their location spans and time spans may already lead to the fact that an overload situation occurring for a very short time may be converted into a longer situation that may just still be processed. This may of course also be by e.g. conditional earlier termination of an audio object within an allowed time span, which audio object would not have existed for very long any more anyway, but which would have led to an overload situation of this renderer, through which the new audio object would have been rejected, due to an audio object newly transmitted to the renderer.

At this point, it is also to be pointed out that rejecting an audio object previously led to the fact that the entire audio object was not rendered, which is particularly undesirable if the old audio object might have taken only one more second and a new audio object with a length of maybe a few minutes would have been completely omitted/rejected due to a short overload situation, which might only have been present due to an overlap of one second with the old audio object.

According to the invention, this problem is eliminated by terminating e.g. the earlier audio object, as far as a corresponding span was given, already one second earlier, or by shifting the later audio object backward within a predetermined time span e.g. by one second, so that the audio objects no longer overlap and thus no unpleasant rejection of the entire later audio object, which may have a length of minutes, is obtained.

According to the invention, no concrete time instant, but a time interval is defined for the start of an audio object or for the end of an audio object. Thereby, it is possible to intercept transfer rate peaks and ensuing capacity or performance problems by displacing the transmission or processing of the respective audio data forward or backward.

BRIEF DESCRIPTION OF THE DRAWINGS

Embodiments of the present invention will be detailed subsequently referring to the appended drawings, in which.

DETAILED DESCRIPTION OF PREFERRED EMBODIMENTS

Figure 1:
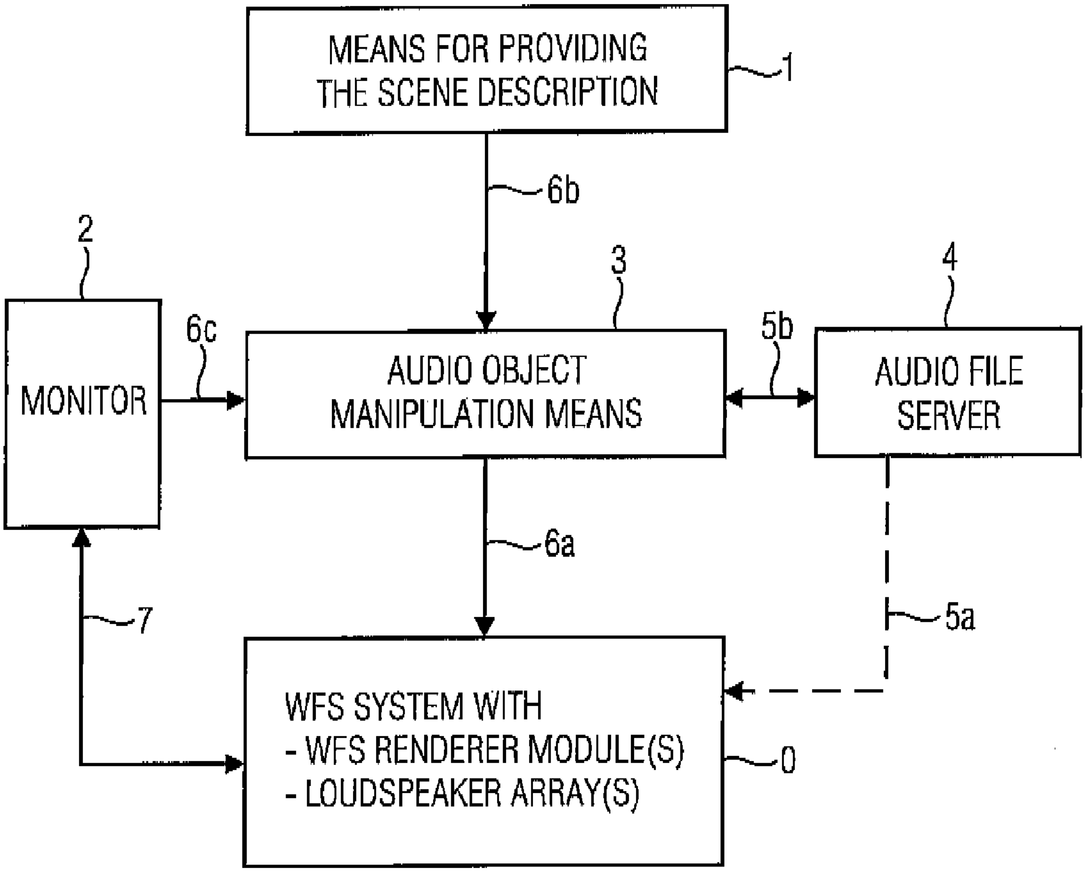
FIG. 1 is a block circuit diagram of the inventive apparatus.

FIG. 1 shows an inventive apparatus for controlling a wave field synthesis rendering means arranged in a wave field synthesis system 0, wherein the wave field synthesis rendering means is formed to generate synthesis signals for a plurality of loudspeakers within a loudspeaker array from audio objects. In particular, an audio object includes an audio file for a virtual source, as well as at least one source position at which the virtual source is to be arranged inside or outside the reproduction room, i.e. with respect to the listener.

The inventive apparatus shown in FIG. 1 includes a means 1 for providing a scene description, wherein the scene description fixes a temporal sequence of audio data, wherein an audio object for a virtual source associated with the audio object defines a temporal start or a temporal end, wherein the audio object for the virtual source comprises a time span in which the start or the end of the audio object must lie. Alternatively or additionally, the scene description is formed such that the audio object comprises a location span in which a position of the virtual source must lie.

The inventive apparatus further includes a monitor 2 formed to monitor a utilization of the wave field synthesis system 0, to thus determine a utilization situation of the wave field synthesis system.

There is also provided an audio object manipulation means 3, which is formed to vary an actual starting point or end point of the audio object to be observed by the wave field synthesis rendering means within the time span or an actual position of the virtual source within the location span, depending on a utilization situation of the wave field synthesis system 0. Advantageously, there is also provided an audio file server 4, which can be implemented together with the audio object manipulation means 3 in an intelligent database. Alternatively, it is a simple file server, which supplied an audio file either via a data connection 5*a* directly to the wave field synthesis system, and particularly to the wave field synthesis rendering means, depending on a control signal from the audio object manipulation means 3. Furthermore, it is advantageous, according to the invention, to supply the audio file via a data connection 5*b* to the audio object manipulation means 3, which then supplies a data stream from the wave field synthesis system 0, and particularly the individual renderer modules or the single renderer module, via its control line 6*a*, which includes both the actual starting points and/or end points of the audio object determined by the manipulation means and/or includes the corresponding position as well as includes the audio data itself.

Via an input line 6*b*, the audio object manipulation means 3 is supplied with the scene description from the means 1, while the utilization situation of the wave field synthesis system 0 is provided from the monitor 2 via a further input line 6*c*. It is to be pointed out that the individual lines having been described in FIG. 1 do not necessarily have to be embodied as separate cables etc., but only are to symbolize that corresponding data is transmitted in the system in order to implement the inventive concept. In this respect, the monitor 2 also is connected to the wave field synthesis system 0 via a monitoring line 7, in order to check, depending on the situation, for example, how many sources are currently being processed in a renderer module, and whether the capacity limit has been reached, or in order to check what the current data rate is like, which presently predominates on the line 6*a* or the data line 5*a* or on another line within the wave field synthesis system.

At this point, it is to be pointed out that the utilization situation, however, does not necessarily have to be the current utilization situation, but may also be a future utilization situation. This implementation is advantageous in that the variability, i.e. how the individual audio objects can be planned and/or manipulated with respect to each other regarding an avoidance of overload peaks in the future, then helps to avoid an overload peak only some time in the future, e.g. by current variation within a time span. The efficiency of the inventive concept becomes the greater, the more sources having no fixed start points or end points, but having start points or end points provided with a time span, or not having fixed source positions but source positions provided with a location span, exist.

At this point, it is to be pointed out that there may particularly also be sources, e.g. background noises, in which the source position is insignificant, i.e. that may come from anywhere. While previously a position also had to be indicated for these sources, the position indication may now be employed and/or supplemented by a very large explicit or implicit location span. In particular, this is of importance in multi-renderer systems. If e.g. a reproduction room having four sides and having a loudspeaker array supplied by a renderer of its own on each side is considered, planning can be done especially well due to the arbitrary location span. Thus, for example, the situation could arise that the front renderer currently is overloaded, and then a source, which may be at any position, comes. Then, the inventive audio object manipulation means 3 would position the position of this virtual source, the current position of which is insignificant for the listening impression and/or for the audio scene, so that it is rendered by another renderer than the front renderer, i.e. does not load the front renderer therewith, but only loads another renderer, which is, however, not working at its capacity limit anyway.

As it has already been explained, the flexibility and efficiency of the inventive concept thus increases, the more variable the scene description is designed. However, this also is of benefit to the needs of the scene author, since it is enough for them to indicate time spans and location spans, and they hence do not have to definitely decide for each source at points actually insignificant for the listening impression. Such decisions would represent a troublesome duty for the sound master, which is taken off them by the inventive concept or even still used to enhance the actual capacity by intelligent planning within a scope given by the sound master, as compared with the capacity of a wave field synthesis system with rigid processing.

Subsequently, with reference to FIG. 2, it is pointed to information an audio object advantageously should have. Thus, an audio object is to specify the audio file that in a way represents the audio content of a virtual source. Thus, the audio object, however, does not have to include the audio file, but may have an index referring to a defined location in a database at which the actual audio file is stored.

Furthermore, an audio object advantageously includes an identification of the virtual source, which may for example be a source number or a meaningful file name, etc. Furthermore, in the present invention, the audio object specifies a time span for the beginning and/or the end of the virtual source, i.e. the audio file. If only a time span for the beginning is specified, this means that the actual starting point of the rendering of this file may be changed by the renderer within the time span. If additionally a time span for the end is given, this means that the end may also be varied within the time span, which will altogether lead to a variation of the audio file also with respect to its length, depending on the implementation. Any implementations are possible, such as also a definition of the start/end time of an audio file so that the starting point is indeed allowed to be shifted, but that the length must not be changed in any case, so that the end of the audio file thus is also shifted automatically. For noise, in particular, it is however advantageous to also keep the end variable, because it typically is not problematic whether e.g. a sound of wind will start a little sooner or later or end a little sooner or later. Further specifications are possible and/or desired depending on the implementation, such as a specification that the starting point is indeed allowed to be varied, but not the end point, etc.

Advantageously, an audio object further includes a location span for the position. Thus, for certain audio objects, it will not be important whether they come from e.g. front left or front center or are shifted by a (small) angle with respect to a reference point in the reproduction room. However, there are also audio objects, particularly again from the noise region, as it has been explained, which can be positioned at any arbitrary location and thus have a maximum location span, which may for example be specified by a code for "arbitrary" or by no code (implicitly) in the audio object.

An audio object may include further information, such as an indication of the type of virtual source, i.e. whether the virtual source has to be a point source for sound waves or has to be a source for plane waves or has to be a source producing sources of arbitrary wave front, as far as the renderer modules are capable of processing such information.

Figures 2, 3:
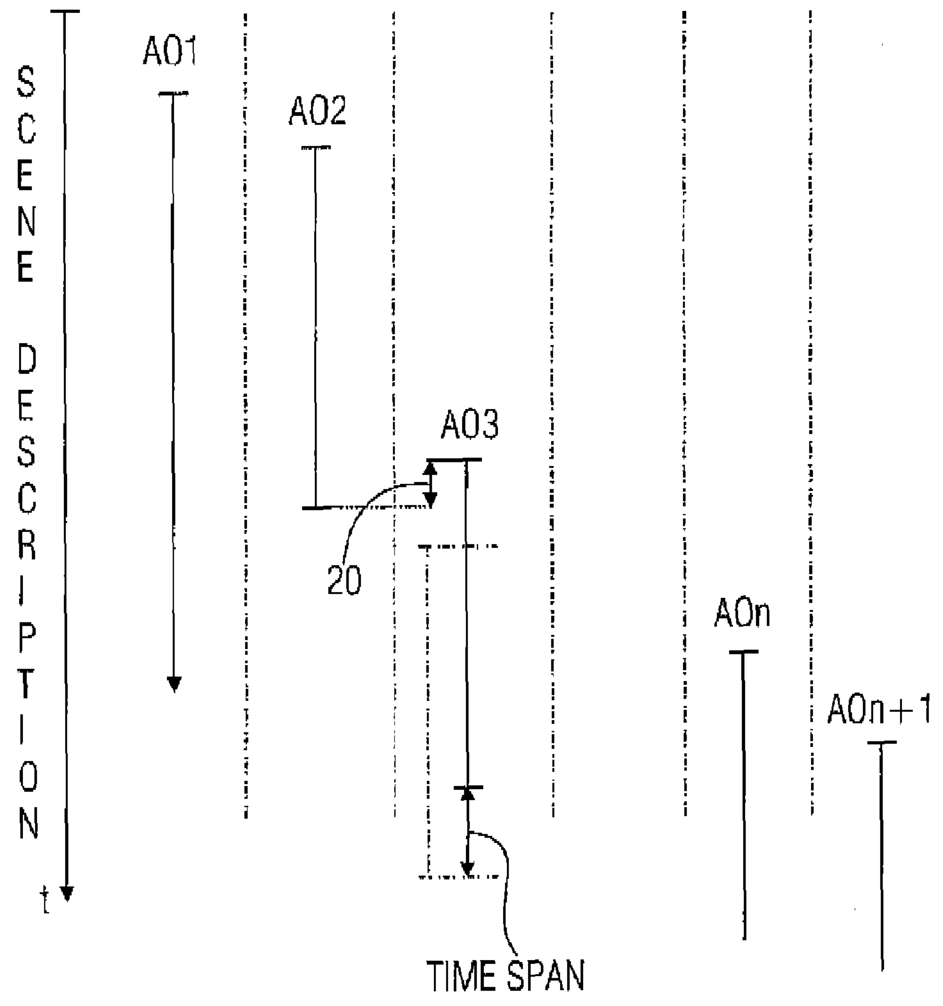
FIG. 2 shows an exemplary audio object.
FIG. 3 shows an exemplary scene description.

FIG. 3 exemplarily shows a schematic illustration of a scene description in which the temporal sequence of various audio objects AO1, . . . , AOn+1 is illustrated. In particular, it is pointed to the audio object AO3, for which a time span is defined, as drawn in FIG. 3. Thus, both the starting point and the end point of the audio object AO3 in FIG. 3 can be shifted by the time span. The definition of the audio object AO3, however, is that the length must not be changed, which is, however, variably adjustable from audio object to audio object.

Thus, it can be seen that by shifting the audio object AO3 in positive temporal direction, a situation may be reached in which the audio object AO3 does not begin until after the audio object AO2. If both audio objects are played on the same renderer, a short overlap 20, which might otherwise occur, can be avoided by this measure. If the audio object AO3 already were the audio object lying above the capacity of the known renderer, due to already all further audio objects to be processed on the renderer, such as audio objects AO2 and AO1, complete suppression of the audio object AO3 would occur without the present invention, although the time span 20 was only very small. According to the invention, the audio object AO3 is shifted by the audio object manipulation means 3 so that no capacity excess and thus also no suppression of the audio object AO3 takes place any more.

In the embodiment of the present invention, a scene description having relative indications is used. Thus, the flexibility is increased by the beginning of the audio object AO2 no longer being given in an absolute point in time, but in a relative period of time with respect to the audio object AO1. Correspondingly, a relative description of the location indications is advantageous, i.e. not the fact that an audio object is to be arranged at a certain position xy in the reproduction room, but is e.g. offset to another audio object or to a reference object by a vector.

Thereby, the time span information and/or location span information may be accommodated very efficiently, namely simply by the time span being fixed so that it expresses that the audio object AO3 may begin in a period of time between two minutes and two minutes and twenty seconds after the start of the audio object AO1.

Such a relative definition of the space and time conditions leads to a database-efficient representation in form of constraints, as it is described e.g. in "Modeling Output Constraints in Multimedia Database Systems", T. Heimrich, 1th International Multimedia Modelling Conference, IEEE, Jan. 2, 2005 to Jan. 14, 2005, Melbourne. Here, the use of constraints in database systems is illustrated, to define consistent database states. In particular, temporal constraints are described using Allen relations, and spatial constraints using spatial relations. Herefrom, favorable output constraints can be defined for synchronization purposes. Such output constraints include a temporal or spatial condition between the objects, a reaction in case of a violation of a constraint, and a checking time, i.e. when such a constraint must be checked.

In the embodiment of the present invention, the spatial/temporal output objects of each scene are modeled relatively to each other. The audio object manipulation means achieves translation of these relative and variable definitions into an absolute spatial and temporal order. This order represents the output schedule obtained at the output 6*a* of the system shown in FIG. 1 and defining how particularly the renderer module in the wave field synthesis system is addressed. The schedule thus is an output plan arranged in the audio data corresponding to the output conditions.

Figure 4:
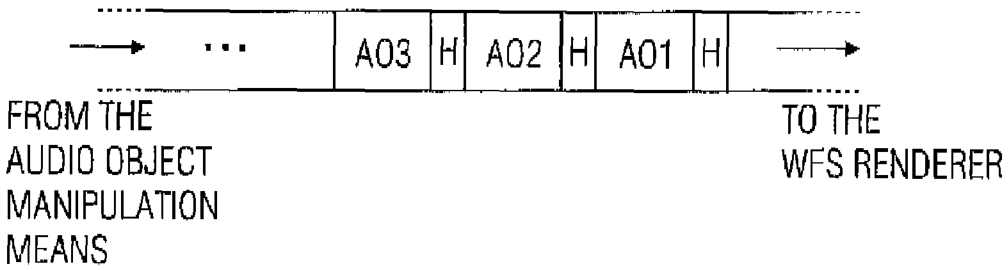
FIG. 4 shows a bit stream, in which a header having the current time data and position data is associated with each audio object.

Subsequently, on the basis of FIG. 4, an embodiment of such an output schedule will be set forth. In particular, FIG. 4 shows a data stream, which is transmitted from left to right according to FIG. 4, i.e. from the audio object manipulation means 3 of FIG. 1 to one or more wave field synthesis renderers of the wave field system 0 of FIG. 1. In particular, the data stream includes, for each audio object in the embodiment shown in FIG. 4, at first a header H, in which the position information and the time information are, and a downstream audio file for the special audio object, which is designated with AO1 for the first audio object, AO2 for the second audio object, etc. in FIG. 4.

A wave field synthesis renderer then obtains the data stream and recognizes, e.g. from present and fixedly agreed-upon synchronization information, that now a header comes. On the basis of further synchronization information, the renderer then recognizes that the header now is over. Alternatively, also a fixed length in bits can be agreed for each header.

Following the reception of the header, the audio renderer in the embodiment of the present invention shown in FIG. 4 automatically knows that the subsequent audio file, i.e. e.g. AO1, belongs to the audio object, i.e. to the source position identified in the header.

FIG. 4 shows serial data transmission to a wave field synthesis renderer. Of course, several audio objects are played in a renderer at the same time. For this reason, the renderer necessitates an input buffer preceded by a data stream reading means to parse the data stream. The data stream reading means will then interpret the header and store the accompanying audio files correspondingly, so that the renderer then reads out the correct audio file and the correct source position from the input buffer, when it is an audio object's turn to render. Other data for the data stream is of course possible. Separate transmission of both the time/location information and of the actual audio data may also be used. The combined transmission illustrated in FIG. 4 is advantageous, however, since it eliminates data consistency problems by concatenation of the position/time information with the audio file, since it is ensured that the renderer also has the right source position for audio data and is not still rendering e.g. audio files of an earlier source, but is already using position information of the new source for rendering.

The present invention thus is based on an object-oriented approach, i.e. that the individual virtual sources are understood as objects characterized by an audio object and a virtual position in space and maybe by the type of source, i.e. whether it is to be a point source for sound waves or a source for plane waves or a source for sources of other shape.

As it has been set forth, the calculation of the wave fields is very computation-time intensive and bound to the capacities of the hardware used, such as soundcards and computers, in connection with the efficiency of the computation algorithms. Even the best-equipped PC-based solution thus quickly reaches its limits in the calculation of the wave field synthesis, when many demanding sound events are to be represented at the same time. Thus, the capacity limit of the software and hardware used gives the limitation with respect to the number of virtual sources in mixing and reproduction.

Figure 6:
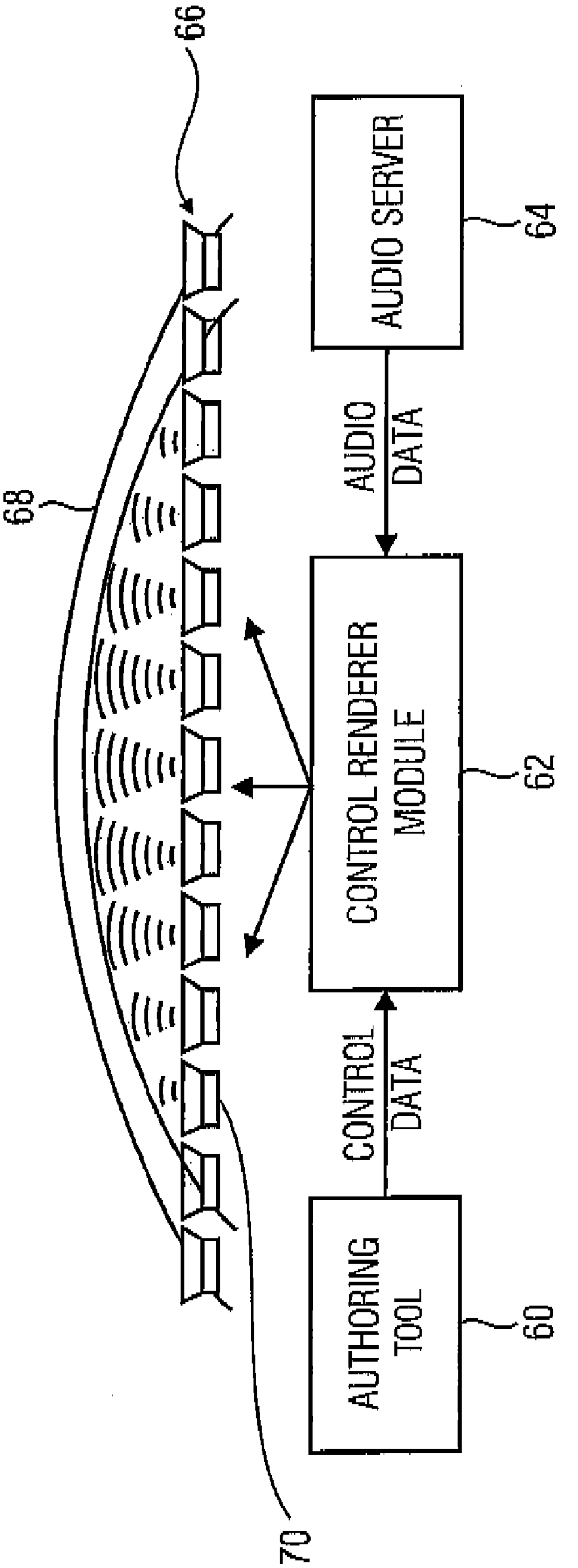
FIGURE 6 (PRIOR ART)
FIG. 6 is a schematic illustration of a known wave field synthesis concept.
Figure 7:
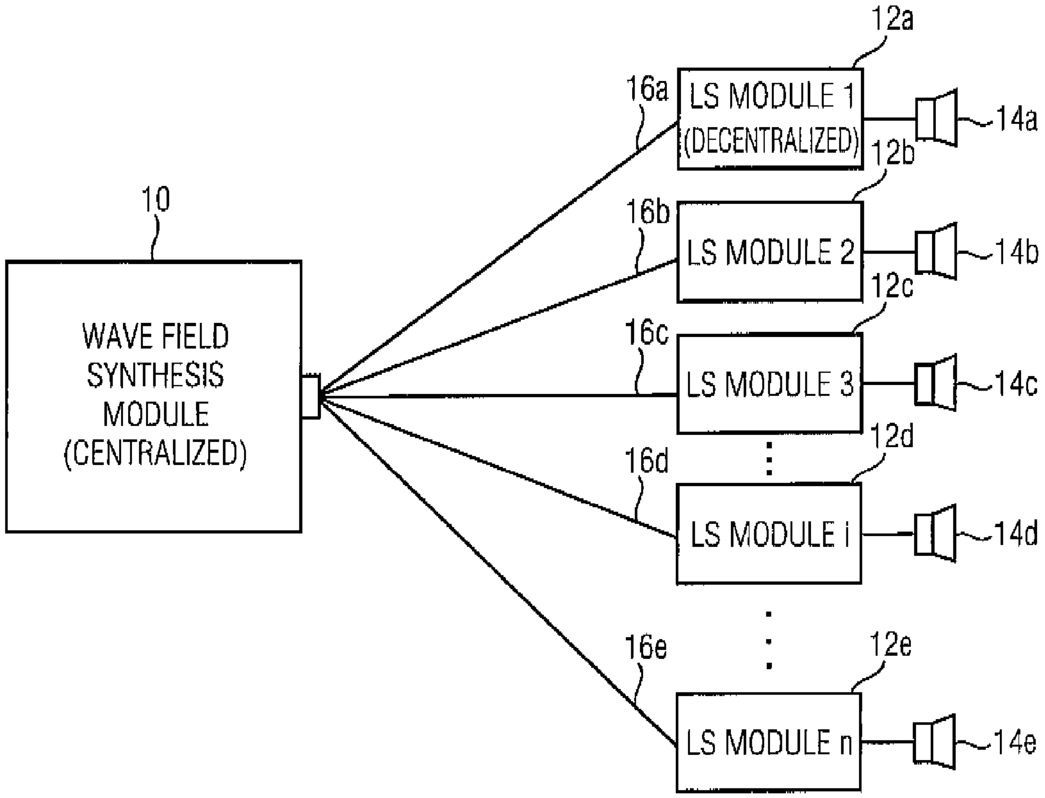
FIGURE 7 (PRIOR ART)
FIG. 7 is a further illustration of a known wave field synthesis concept.

FIG. 6 shows such a known wave field synthesis concept limited in its capacity, which includes an authoring tool 60, a control renderer module 62, and an audio server 64, wherein the control renderer module is formed to provide a loudspeaker array 66 with data, so that the loudspeaker array 66 generates a desired wave front 68 by superposition of the individual waves of the individual loudspeakers 70. The authoring tool 60 enables the user to create and edit scenes and control the wave-field-synthesis-based system. A scene thus consists of both information on the individual virtual audio sources and of the audio data. The properties of the audio sources and the references to the audio data are stored in an XML scene file. The audio data itself is filed on the audio server 64 and transmitted to the renderer module therefrom. At the same time, the renderer module obtains the control data from the authoring tool, so that the control renderer module 62, which is embodied in centralized manner, may generate the synthesis signals for the individual loudspeakers. The concept shown in FIG. 6 is described in "Authoring System for Wave Field Synthesis", F. Melchior, T. Röder, S. Brix, S. Wabnik and C. Riegel, AES Convention Paper, 115th AES convention, Oct. 10, 2003, New York.

If this wave field synthesis system is operated with several renderer modules, each renderer is supplied with the same audio data, no matter if the renderer needs this data for the reproduction due to the limited number of loudspeakers associated with the same or not. Since each of the current computers is capable of calculating 32 audio sources, this represents the limit for the system. On the other hand, the number of the sources that can be rendered in the overall system is to be increased significantly in efficient manner. This is one of the substantial prerequisites for complex applications, such as movies, scenes with immersive atmospheres, such as rain or applause, or other complex audio scenes.

According to the invention, a reduction of redundant data transmission processes and data processing processes is achieved in a wave field synthesis multi-renderer system, which leads to an increase in computation capacity and/or the number of audio sources computable at the same time.

For the reduction of the redundant transmission and processing of audio and meta data to the individual renderer of the multi-renderer system, the audio server is extended by the data output means, which is capable of determining which renderer needs which audio and meta data. The data output means, maybe assisted by the data manager, needs several pieces of information, in an embodiment. This information at first is the audio data, then time and position data of the sources, and finally the configuration of the renderers, i.e. information about the connected loudspeakers and their positions, as well as their capacity. With the aid of data management techniques and the definition of output conditions, an output schedule is produced by the data output means with a temporal and spatial arrangement of the audio objects. From the spatial arrangement, the temporal schedule and the renderer configuration, the data management module then calculates which sources are relevant for which renderers at a certain time instant.

Figure 5:
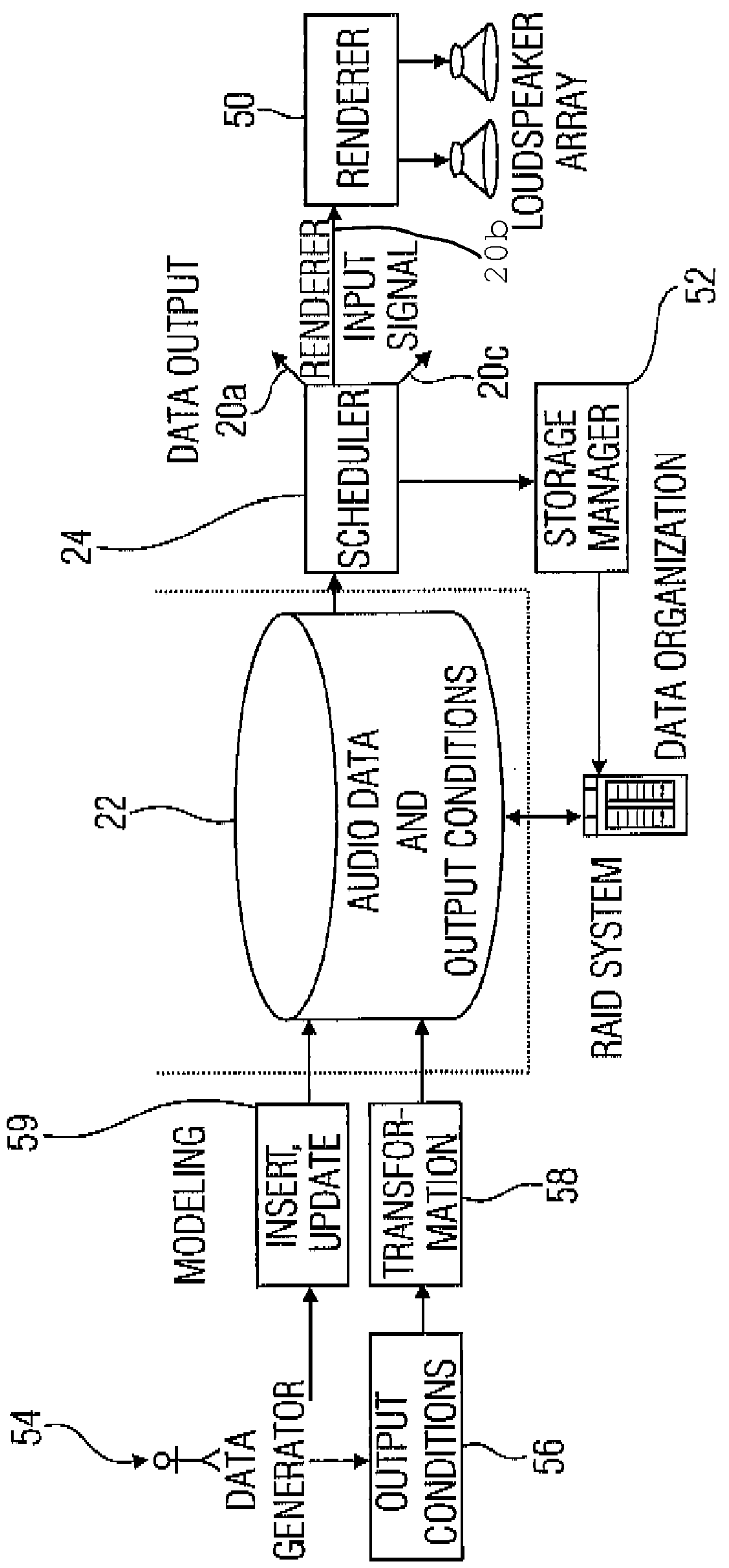
FIG. 5 shows an embedding of the inventive concept into an overall wave field synthesis system.

An advantageous overall concept is illustrated in FIG. 5. The database 22 is supplemented by the data output means 24 on the output side, wherein the data output means is also referred to as scheduler. This scheduler then generates the renderer input signals for the various renderers 50 at its outputs 20*a*, 20*b*, 20*c*, so that the corresponding loudspeakers of the loudspeaker arrays are supplied.

Advantageously, the scheduler 24 also is assisted by a storage manager 52, in order to configure the database 42 by means of a RAID system and corresponding data organization defaults.

On the input side, there is a data generator 54, which may for example be a sound master or an audio engineer who is to model or describe an audio scene in object-oriented manner. Here, it gives a scene description including corresponding output conditions 56, which are then stored together with audio data in the database 22 after a transformation 58, if necessary. The audio data may be manipulated and updated by means of an insert/update tool 59.

Depending on the conditions, the inventive method may be implemented in hardware or in software. The implementation may be on a digital storage medium, particularly a floppy disk or CD, with electronically readable control signals capable of cooperating with a programmable computer system so that the method is executed. In general, the invention thus also consists in a computer program product with program code stored on a machine-readable carrier for performing the method, when the computer program product is executed on a computer. In other words, the invention may thus also be realized as a computer program with program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for controlling a wave field synthesis renderer arranged in a wave field synthesis system, wherein the wave field synthesis renderer is formed to generate, from audio objects, wherein an audio file for a virtual source arranged at a source position is associated with an audio object, synthesis signals for a plurality of loudspeakers coupled to the wave field synthesis renderer, comprising:

a provider for providing a scene description, wherein the scene description sets a temporal sequence of audio objects, wherein an audio object defines a temporal start or a temporal end for a virtual source associated with the audio object, wherein the audio object for the virtual source comprises a time span in which the start or the end of the audio object must exist, or wherein the audio object comprises a location span in which a position of the virtual source must exist;

a monitor for monitoring a utilization situation of the wave field synthesis system; and an audio object manipulator for varying an actual starting point or an actual end point of the audio object to be considered by the wave field synthesis renderer within the time span or an actual position of the virtual source within the location span, depending on a utilization situation of the wave field synthesis system.

2. The apparatus according to claim 1, wherein the monitor is formed to monitor a utilization situation of a data connection between the audio object manipulator and the wave field synthesis renderer; and wherein the audio object manipulator is formed to vary the actual starting point or the actual end point of an audio object so that a utilization peak of the data connection is reduced as compared with no variation.

3. The apparatus according to claim 1, wherein the monitor is formed to monitor a utilization situation of the wave field synthesis renderer, and wherein the audio object manipulator is formed to vary the actual starting point or the actual end point so that a maximum number of sources to be processed at the same time given by the wave field synthesis renderer is not exceeded at a time instant, or a number of audio objects to be processed at the same time by the wave field synthesis renderer is reduced as compared with no variation.

4. The apparatus according to claim 1, wherein the monitor is formed to predict the utilization situation of the wave field synthesis system over a predetermined prediction time interval.

5. The apparatus according to claim 4, wherein the wave field synthesis renderer comprises an input buffer, wherein the predetermined prediction time interval depends on a size of the input buffer.

6. The apparatus according to claim 1, wherein the wave field synthesis renderer comprises a plurality of renderer modules, with which loudspeakers arranged at different locations in a reproduction room are associated, and wherein the audio object manipulator is formed to vary a current position of the virtual source within the location span so that a renderer module is not active for the generation of the synthesis signals, although the renderer module would have been active for another position within the location span.

7. The apparatus according to claim 1, wherein the audio object manipulator is formed to choose a current time instant within a first half of the time span in a case in which the monitor detects a utilization a predetermined threshold below the maximum utilization.

8. The apparatus according to claim 7, wherein the audio object manipulator is formed to choose an earliest time instant defined by the time span as the actual starting point or the actual end point in a case in which the monitor signalizes a utilization lying a predetermined threshold below the maximum utilization.

9. The apparatus according to claim 1, wherein the provider is formed to provide a scene description in which a temporal or spatial positioning of the audio objects relative to another audio object or relative to a reference audio object is defined, and wherein the audio object manipulator is formed to compute the actual starting point or the actual position of the virtual source for each audio object, based on the temporal or spatial positioning of the audio objects relative to another audio object or relative to the reference audio object.

10. The apparatus according to claim 1, wherein the provider is formed to provide a scene description in which a time span is indicated only for a group of sources, and in which a fixed starting point is indicated for other sources.

11. The apparatus according to claim 10, wherein the group of sources comprises a predetermined characteristic including a noise-like audio file of the virtual source.

12. The apparatus according to claim 10, wherein the group of sources includes noise sources.

13. A method for controlling a wave field synthesis renderer arranged in a wave field synthesis system, wherein the wave field synthesis renderer is formed to generate, from audio objects, wherein an audio file for a virtual source arranged at a source position is associated with an audio object, synthesis signals for a plurality of loudspeakers coupled to the wave field synthesis renderer, comprising:

providing a scene description, wherein the scene description sets a temporal sequence of audio objects, wherein an audio object defines a temporal start or a temporal end for a virtual source associated with the audio object, wherein the audio object for the virtual source comprises a time span in which the start or the end of the audio object must exist, or wherein the audio object comprises a location span in which a position of the virtual source must exist;

monitoring a utilization situation of the wave field synthesis system; and varying an actual starting point or an actual end point of the audio object to be considered by the wave field synthesis renderer within the time span or an actual position of the virtual source within the location span, depending on a utilization situation of the wave field synthesis system.

14. A computer program with program code for performing, when the program is executed on a computer, a method for controlling a wave field synthesis renderer arranged in a wave field synthesis system, wherein the wave field synthesis renderer is formed to generate, from audio objects, wherein an audio file for a virtual source arranged at a source position is associated with an audio object, synthesis signals for a plurality of loudspeakers coupled to the wave field synthesis renderer, the method comprising:

providing a scene description, wherein the scene description sets a temporal sequence of audio objects, wherein an audio object defines a temporal start or a temporal end for a virtual source associated with the audio object, wherein the audio object for the virtual source comprises a time span in which the start or the end of the audio object must exist, or wherein the audio object comprises a location span in which a position of the virtual source must exist;

monitoring a utilization situation of the wave field synthesis system; and varying an actual starting point or an actual end point of the audio object to be considered by the wave field synthesis renderer within the time span or an actual position of the virtual source within the location span, depending on a utilization situation of the wave field synthesis system.

* * * * *

UNITED STATES PATENT AND TRADEMARK OFFICE

CERTIFICATE OF CORRECTION

PATENT NO. : 7,668,611 B2
APPLICATION NO. : 11/840327
DATED : February 23, 2010
INVENTOR(S) : Katrin Reichelt et al.

It is certified that error appears in the above-identified patent and that said Letters Patent is hereby corrected as shown below:

On the Title Page, Item (73) should read,

Fraunhofer-Gesellschaft zur Foerderung der angewandten Forschung e.V., Munich (DE)

TU Ilmenau, Ilmenau (DE)

Signed and Sealed this

Fourth Day of May, 2010

David J. Kappos
*Director of the United States Patent and Trademark Office*